US007565682B2

(12) United States Patent (10) Patent No.: US 7,565,682 B2
Pickering et al. (45) Date of Patent: Jul. 21, 2009

(54) WEB SERVICE UI INFORMATION GUIDE

(75) Inventors: Andrew Ryan Pickering, Woodinville, WA (US); Eric Alan Smith, Bonney Lake, WA (US); Ravikumar Bangalore Gopinath, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 277 days.

(21) Appl. No.: 11/263,031

(22) Filed: Oct. 31, 2005

(65) Prior Publication Data

US 2007/0118798 A1 May 24, 2007

(51) Int. Cl.
*G06F 3/00* (2006.01)
(52) U.S. Cl. ...................................... 725/733
(58) Field of Classification Search .................. 715/733
See application file for complete search history.

(56) References Cited

U.S. PATENT DOCUMENTS 7,069,498 B1 * 6/2006 Finch et al. ................. 715/234
7,246,158 B2 * 7/2007 Kitada et al. ................ 709/219
2002/0129096 A1 * 9/2002 Mansour et al. ............. 709/203
2002/0156801 A1 * 10/2002 Kitada et al. ................ 707/500
2004/0032423 A1 * 2/2004 Nason et al. ................ 345/746
2005/0149617 A1 * 7/2005 Turnbull et al. ............. 709/203
2005/0210379 A1 * 9/2005 Weathersby et al. ........ 715/513
2006/0036941 A1 * 2/2006 Neil ........................... 715/526
2006/0059422 A1 * 3/2006 Wu et al. .................... 715/513
2006/0224943 A1 * 10/2006 Snyder et al. ............. 715/501.1

\* cited by examiner

*Primary Examiner*—Stephen Hong
*Assistant Examiner*—Samir Termanini
(74) *Attorney, Agent, or Firm*—Merchant & Gould

(57) ABSTRACT

A user information user interface for a networked software service is provided. The user information user interface corresponds to a request for information and is generated to overlap the software service user interface. The user information user interface includes a pointer to a display control on the software service user interface and data corresponding to the display control. The user information user interface can also include a set of selectable icons to facilitate selection of different display controls.

16 Claims, 8 Drawing Sheets

WEB SERVICE UI INFORMATION GUIDE

BACKGROUND

Generally described, network-based computing environments provide an opportunity for users to access software services from a receiving computing device. In a typical operating environment, a receiving computing device can utilize a browser software application, to access software services remotely hosted on a communication network, such as the Internet. For example, a receiving computing device can utilize a browser software application to access a word processing software service remotely hosted by a sending computing device, such as a server computer.

In a typical embodiment, the receiving computing devices implement network-based software services by generating a software service specific user interface within the display portion of the browser software application. In such embodiments, the user is presented with various graphical controls corresponding to the browser software application and additional graphical controls corresponding to the software service specific user interface. As software services grow in popularity and complexity, the number of graphical controls presented on a user display can be confusing, especially to users accessing the specific network-based software service for the first time.

FIGS. 1A and 1B are block diagrams illustrative of a user interface 100 corresponding to a network-based software service. With reference to FIG. 1A, the user interface 100 corresponds to the display generated by a browser software application running on a receiving computing device that includes a set of graphical controls 102, primarily directed to network-based functionality. The user interface 100 can also include various sets of graphical controls 104, 106, and 108 that relate directly to display controls associated with a specific network-based software service. The user interface 100 can further include a display portion 110 for displaying content associated with the specific network-based software service.

With reference to FIG. 1B, the set of graphical controls 104 can include a set of selectable controls 110 associated with a topic, such that selection of a particular topic control can display a set of additional selectable controls 112 associated with various sub-topics. Based on a selected topic 110/sub-topic 112 control, the set of controls 108 can include additional feature controls 114, 118, 122. Each feature control 114, 118, 122 can include various selectable controls 116, 120, 124 associated with each feature control. Additionally, the set of controls 106 can further include a set of links 126 that can be selectable by a user. As illustrated in FIGS. 1A and 1B, the graphical controls 102-126 can be displayed with text and/or graphics (e.g., icons).

One traditional approach to providing users with additional information, such as help information, in network-based software service embodiments corresponds to the generation a second browser software application user interface that includes the additional information, such as technical explanations, frequently asked questions and the like. Although the second browser software application user interface can be displayed alongside the software service user interface, the traditional display approach does not facilitate a direct associated of the additional information to the particular display control on the software service user interface. Additionally, the traditional display approach can become deficient in allowing users to select various topics for the additional information.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A user information user interface for a networked software service is provided. The user information user interface corresponds to a request for information and is generated to overlap the software service user interface. The user information user interface includes a pointer to a display control on the software service user interface and data corresponding to the display control. The user information user interface can also include a set of selectable icons to facilitate selection of different display controls.

In accordance with an aspect of the invention, a method for providing information regarding the software service is provided. The method can be implemented in a communication network including at least one sending computing device and a receiving computing device. The receiving computing device requests data from the sending computing device corresponding to a software service. Based upon code returned form the sending computing device, the receiving computing device then generates a user interface corresponding to the software service on a display.

In accordance with the method, the receiving computing device receives a request for information corresponding to the software service and associates the request for information with at least one display control corresponding to the software service user interface. The request can be automatically received or based upon user interaction. The receiving device then generates a user information display on the receiving computing device such that the user information display overlaps the software service user interface display. Additionally, the user information display includes a graphical pointer to the display control of the software service display control and data corresponding to the at least one display control. The user information display can also include a set of selectable controls that correspond to a set of graphical controls on the software service user interface.

In accordance with another aspect of the invention, a computer-readable medium having computer-executable components for providing information regarding the software service is provided. The computer-executable components are implemented in a communication network including at least one sending computing device and a receiving computing device. The receiving computing device requests data from the sending computing device corresponding to a software service. Based upon data received from the sending computing device, the receiving computing device generates a user interface corresponding to the software service on a display including a set of graphical display controls.

The computer-executable components include a display control identification component for identifying at least one display control corresponding to the software service user interface. The computer-executable components also include a display control information component for identifying data corresponding to the at least one display control. Additionally, the computer-executable components include a display control selection component for selecting a display control. The display control selection component includes a set of selectable display icons corresponding to the set of graphical display controls on the software service user interface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to an information user interface utilized in conjunction with a software application user interface. More specifically, the present invention relates to a user information user interface utilized in conjunction with network-based software service user interface. Although the present invention will be described with relation to illustrative user interfaces and operating environments, one skilled in the relevant art will appreciate that the disclosed embodiments are illustrative in nature and should not be construed as limiting.

Figure 1A:
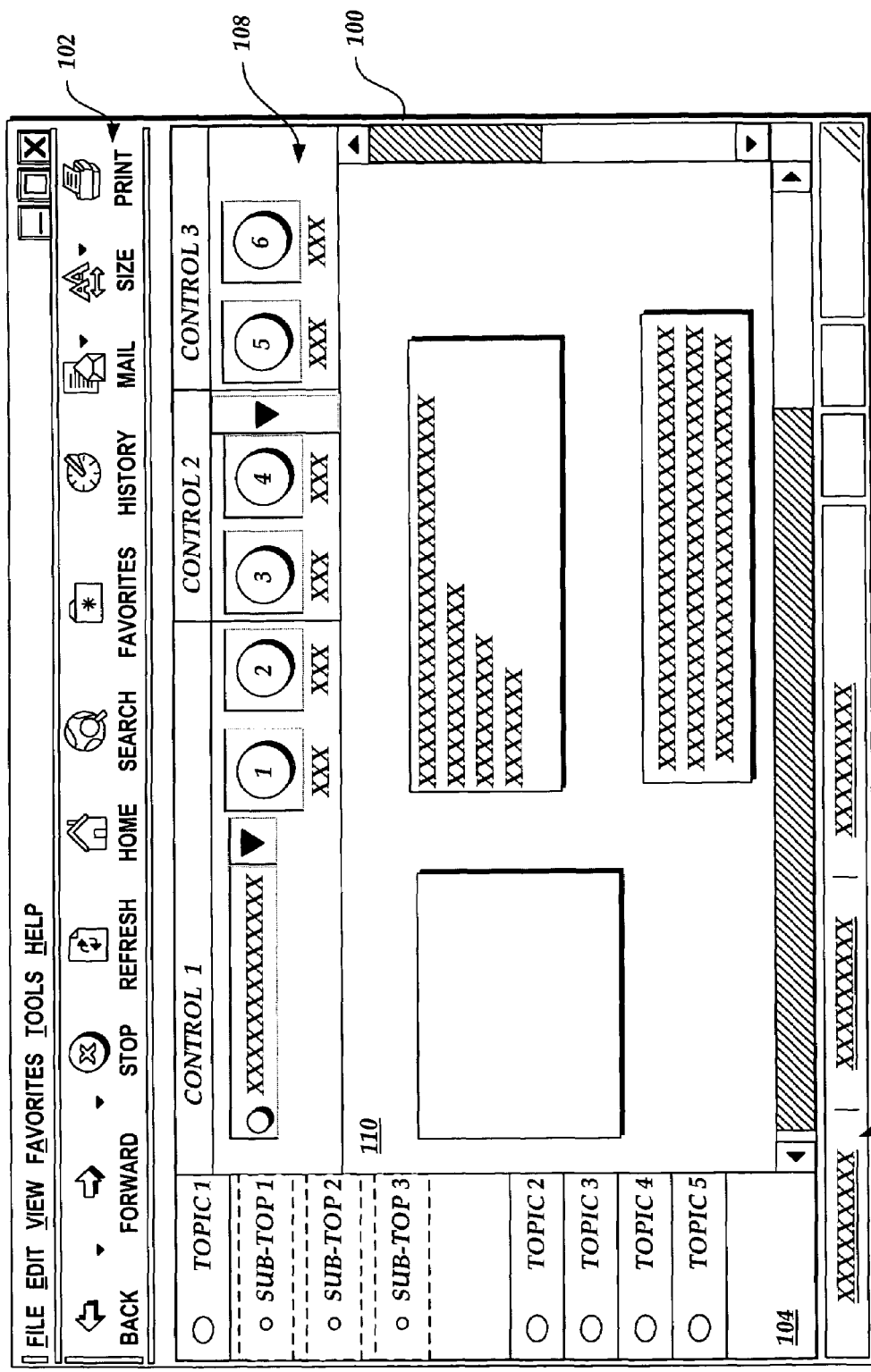
FIGS. 1A and 1B are block diagrams illustrative of a user interface corresponding to a network-based software service including a plurality of display controls.
Figure 1B:
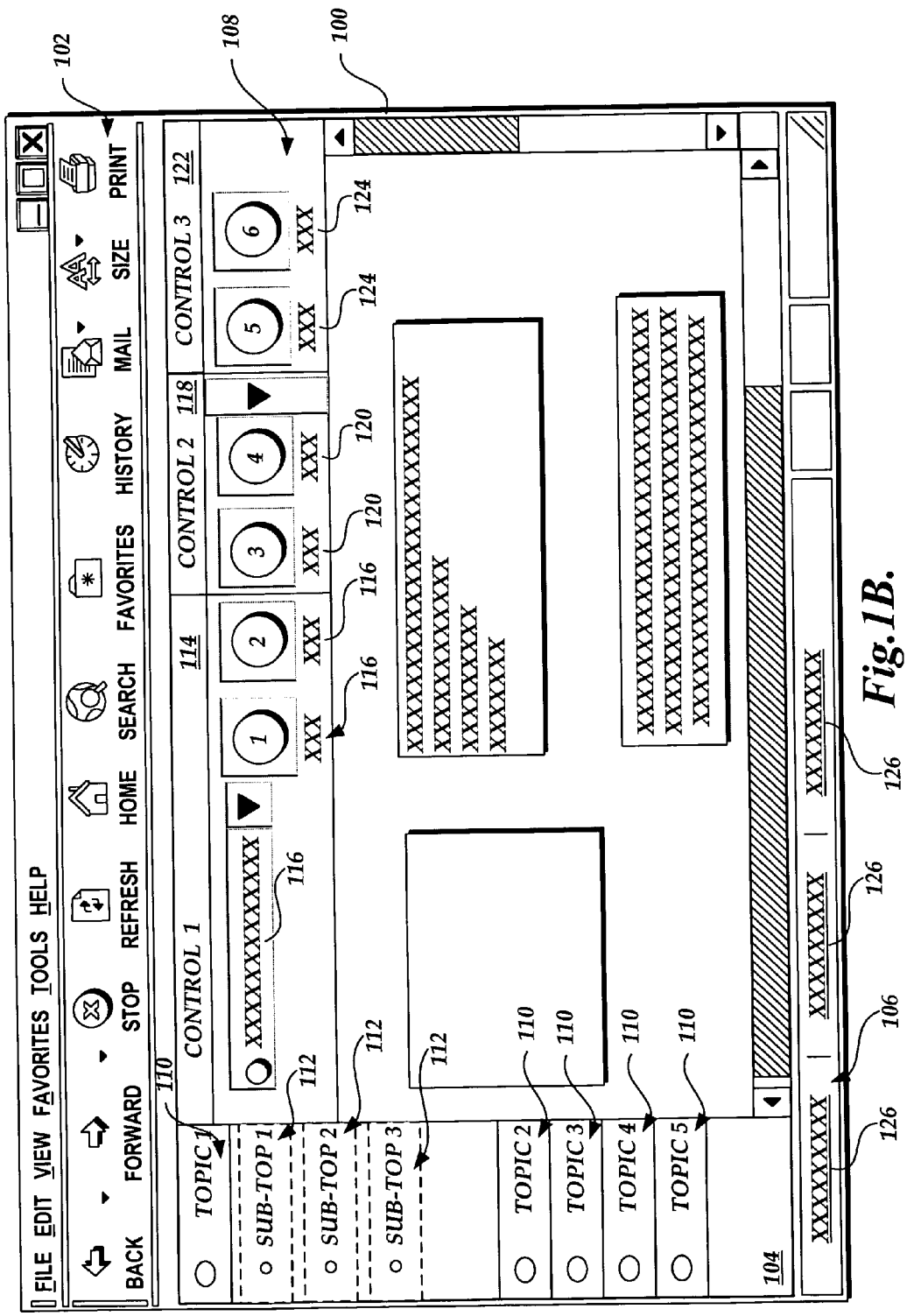
Figure 2:
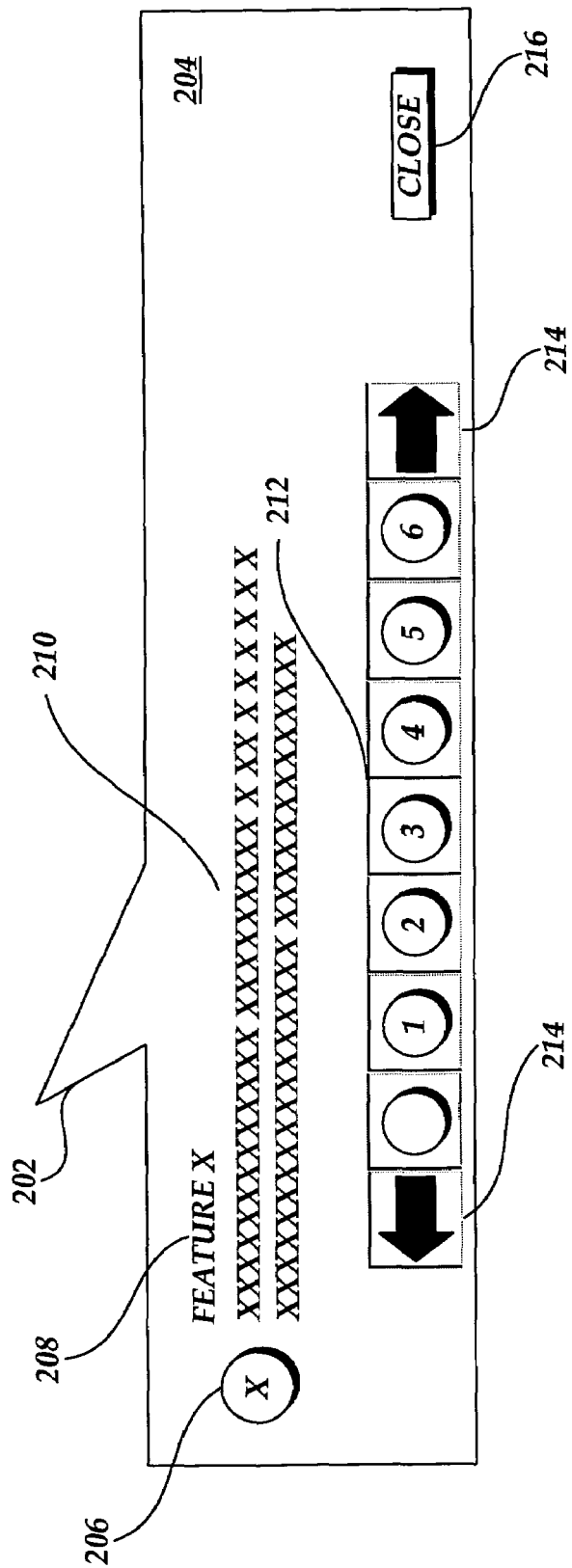
FIG. 2 is a block diagram illustrative of a user information user interface in accordance with an aspect of the present invention.

FIG. 2 is a block diagram illustrative of a user information user interface 200 in accordance with an aspect of the present invention. As will be described in greater detail below, the user information user interface 200 includes various components corresponding to one or more display controls of a software service user interface, such as interface 100. In an illustrative embodiment, the user information user interface 200 overlaps the software service user interface and is controlled as part of the software service user interface. For example, the user information user interface 200 can be transmitted to a receiving computing device as executable code associated with the software service user interface that executed by a browser software application hosting the software service user interface. The user information user interface 200 may be automatically generated by the browser software application upon the generation of the software service user interface. For example, the user information user interface 200 may be automatically generated during a user's initial use of the software service. Additionally, the user information user interface 200 may be generated in response to a user initiated request for additional information, such by manipulating a graphical control or utilizing a keyboard command.

With reference to FIG. 2, the user information user interface 200 can include a graphical pointer 202 portion that identifies a selected display control on the software service user interface. The user information user interface 200 can also include a display portion 204 for display additional information about a selected display control. The display portion 204 of the user information user interface 200 can include an icon 206 corresponding to the icon, or other graphics, that corresponds to the selected display control on the software service user interface. Additionally, the display portion 204 of the user information user interface 200 can include a title 208 or other textual identifier associated with the selected display control on the software service user interface. In an illustrative embodiment, the icon 206 and title 208 correspond to the same icon and title of the display control on the software service user interface. In an alternative embodiment, the icon 206 and/or title 208 can be selectable graphical controls that cause the selected display control to be initiated in the software service user interface in a manner as if the display control had been selected in the software service user interface. Additionally, the display portion 204 of the user information user interface 200 can include an additional control that will cause the selected display control to be initiated in the software service user interface in a manner as if the display control had been selected in the software service user interface.

The display portion 204 of the user information user interface 200 can also include data 210 associated with the selected display control of the software service user interface. In an illustrative embodiment of the present invention, the data 210 can corresponds to descriptive information for describing the function of the display control, instructions how to utilize the display control, frequently asked questions regarding the display control, enhanced user information regarding the display control, information associated with related display controls or additional information. In an illustrative embodiment, the data 210 can be displayed at one time or alternatively, in segments that can be expanded/contracted by the user.

The display portion 204 of the user information user interface 200 can further include a set of selectable controls 212 that correspond to a set of graphical controls on the software service user interface. In an illustrative embodiment, the set of selectable controls 212 can be arranged adjacent to each other in which one selectable control is selected based upon the current selected display control in the software service user interface. This embodiment can be referred to generally as a filmstrip view. The display portion 204 of the user information user interface 200 can also include controls, such as directional controls 214, for selecting a different display control in the set of selectable display controls. The display portion 204 of the user information user interface 200 can also include additional controls, such as control 216, for adjusting the display of the user information user interface 200. As will be explained in below, the format and orientation of the user information user interface 200 can vary depending on the orientation and formatting of the software service user interface.

Figure 3A:
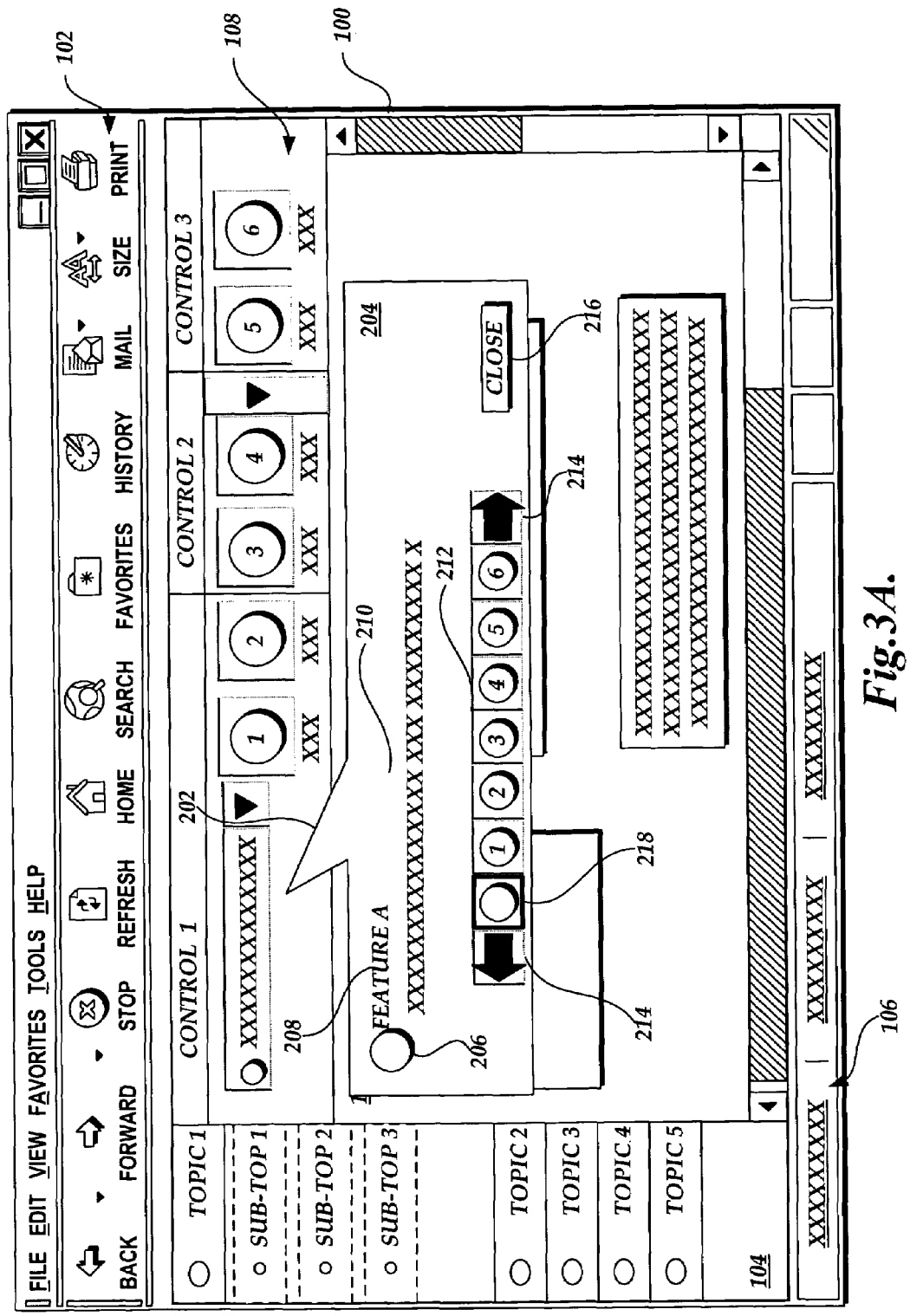
FIGS. 3A and 3B are block diagrams of a user interface corresponding to a network-based software service user interface and a user information user interface in accordance with an aspect of the present invention.
Figure 3B:
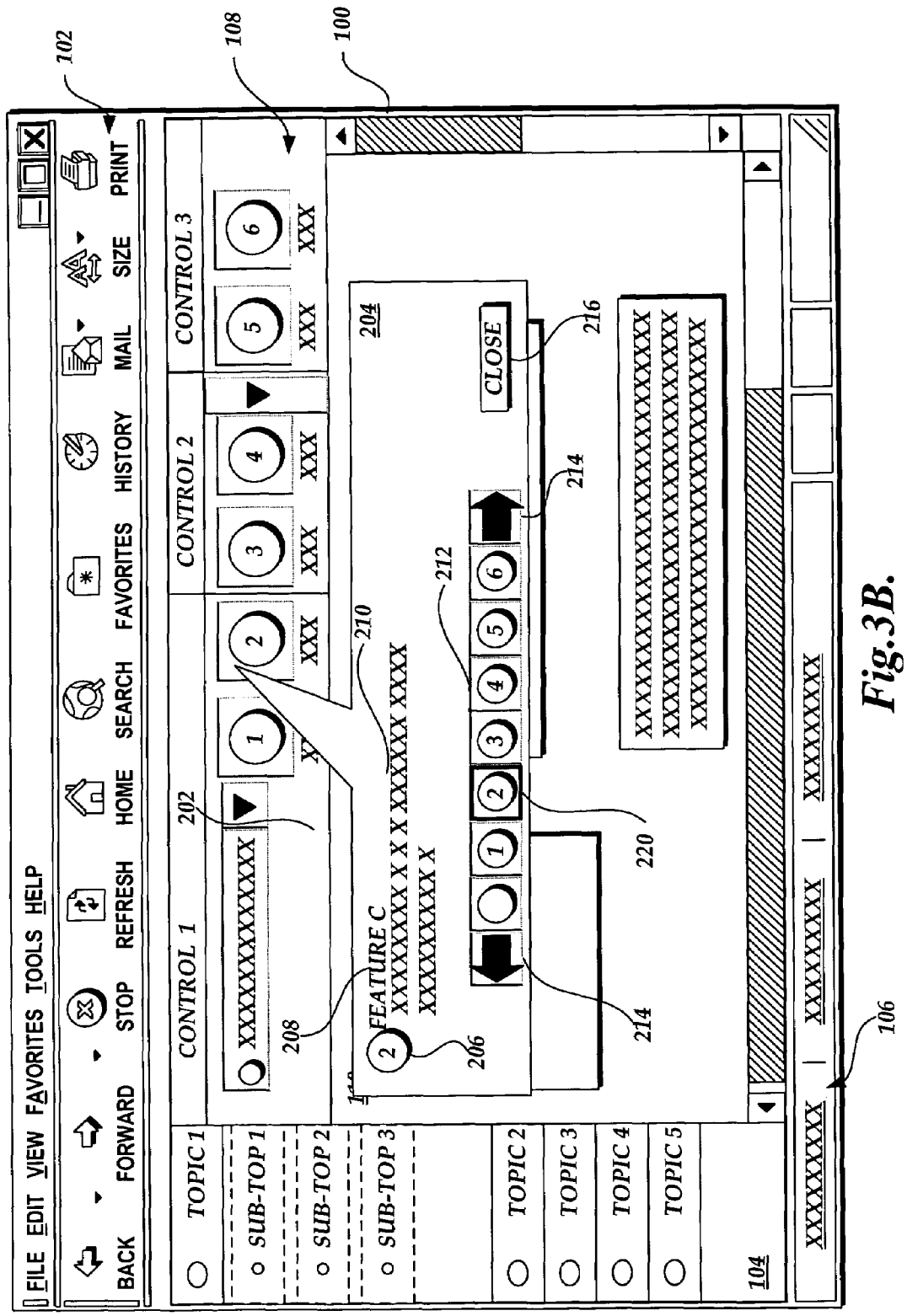

With reference now to FIGS. 3A and 3B, an illustrative user interface including a software service user interface 100 and the user information user interface 200 will be described. With reference to FIG. 3A, the user information user interface 200 is displayed in a manner that overlaps the software service user interface 100 and is adjacent to a particular display control of the software service user interface. In the illustrative embodiment, the graphical pointer 202 is adjacent to a currently selected display control 116 and graphically depicts an association with the selected display control. The display portion 204 of the user information user interface 200 includes an icon 206 and title 208 associated with the selected display control 116. Additionally, the display portion 204 of the user information user interface 200 also includes data 210 associated with the selected display control 116. Further, the set of selectable controls 212 corresponds to the grouping of display controls associated with display control 116. The selectable control 218 associated with the specific display control 116 is highlighted, or otherwise distinguished, in the set of selectable controls.

In the event that a different display control is selected, the user information user interface 200 can be modified according to the newly selected display control. In an illustrative embodiment, a different display control can be selected by manipulating the directional controls 214 of the set of display controls. Alternatively, a different display control can be selected by manipulating a pointing device over the set of display controls 212 (e.g., hovering a mouse). Further, a different display control can be selected by manipulating the actual display controls on the software service user interface while the user information user interface 200 is being displayed.

With reference now to FIG. 3B, upon selection of a different display control 116, the user information user interface 200 is modified. In an illustrative example, the graphical pointer 202 is adjusted to be adjacent to the new currently selected display control 116 and graphically depicts an association with the selected display control. The icon 206 and title 208 are modified to be associated with the newly selected display control 116. Additionally, the data 210 portion is modified to be associated with the selected display control 116. Further, the selectable control 220 associated with the new current specific display control 116 is highlighted in the set of selectable controls 212.

Figure 4:
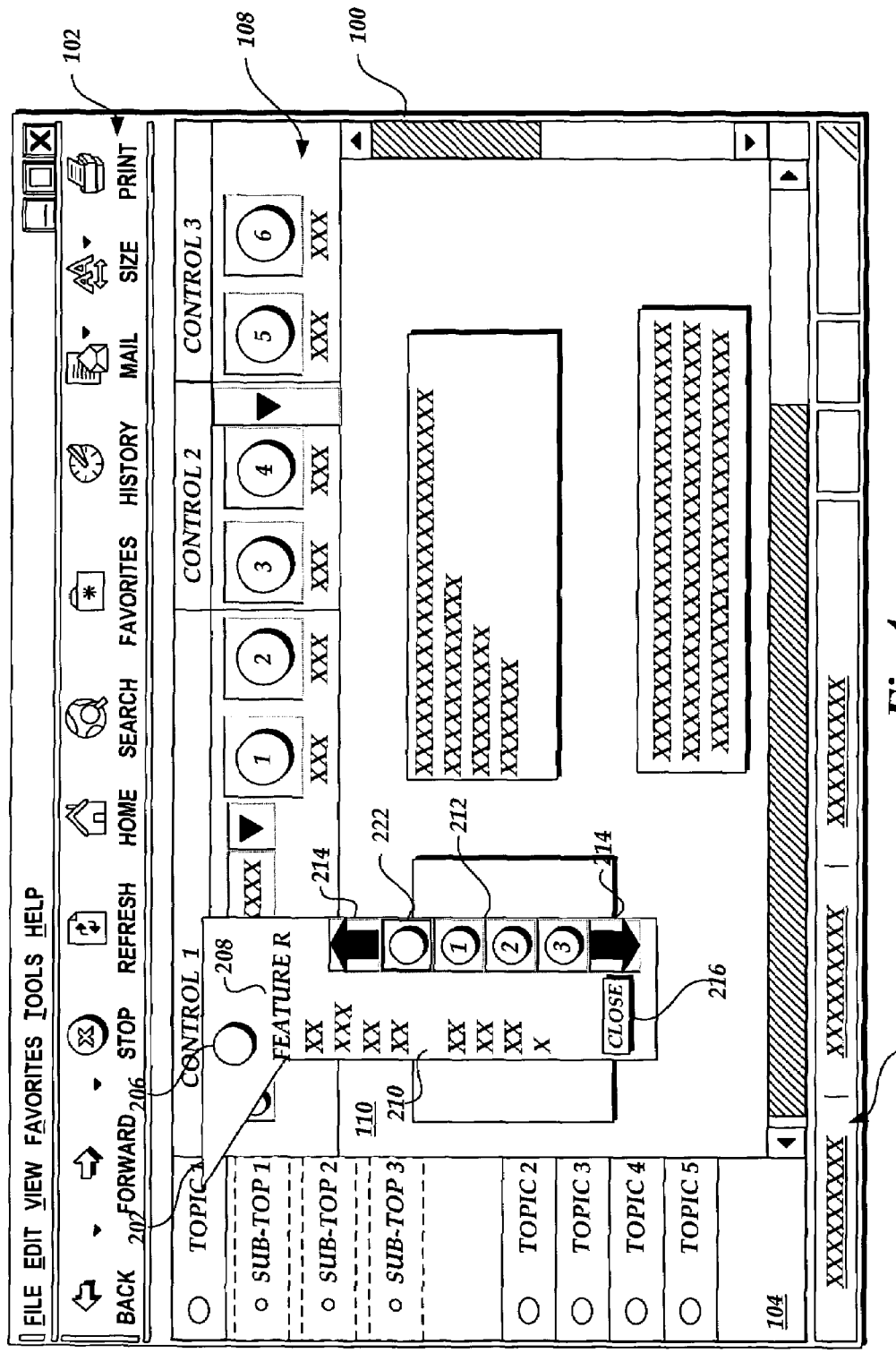
FIG. 4 is a block diagram of a user interface corresponding to a network-based software service user interface and an alternative user information user interface in accordance with an aspect of the present invention.

With reference now to FIG. 4, the user information user interface 200 can be adjusted to correspond to a different location, format and/or orientation of the display control of the software service user interface. In the illustrative example illustrated in FIG. 4, the user information user interface 200 has a more vertical orientation. However, similar to FIGS. 3A and 3B, the user information user interface 200 is displayed in a manner that overlaps the software service user interface 100 and is adjacent to a particular display control of the software service user interface. In the illustrative embodiment, the graphical pointer 202 is adjacent to a currently selected display control 110 and graphically depicts an association with the selected display control. The display portion 204 of the user information user interface 200 includes an icon 206 and title 208 associated with the selected display control 110. Additionally, the display portion 204 of the user information user interface 200 also includes data 210 associated with the selected display control 110. Further, the set of selectable controls 212 corresponds to the grouping of display controls associated with display control 116. In this illustrative example, the set of selectable controls 212 is different from the set of selectable controls illustrated in FIGS. 3A and 3B because the user information user interface 200 corresponds to a different set of display controls in the software service user interface 100. Nevertheless, the selectable control 222 associated with the specific display control 1106 is highlighted, or otherwise distinguished, in the set of selectable controls.

Figure 5A:
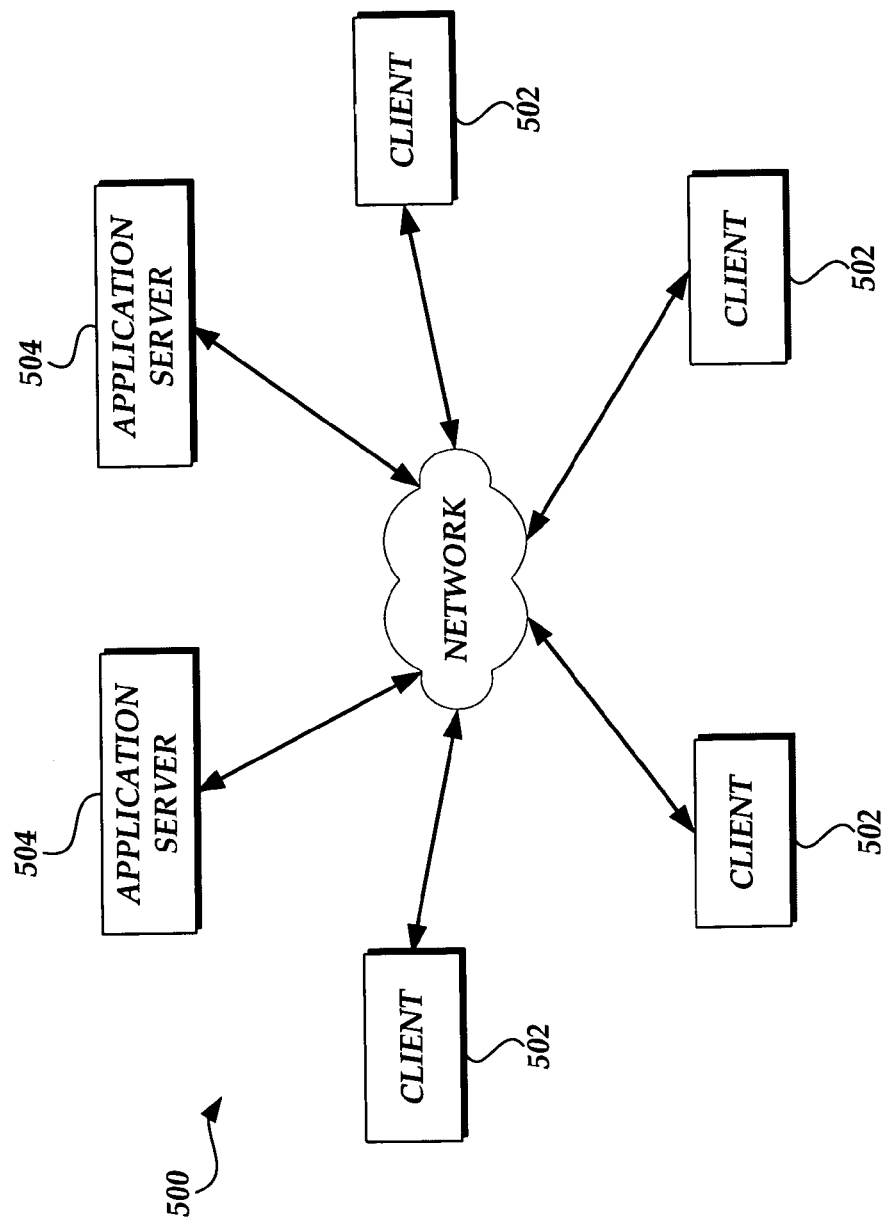
FIGS. 5A and 5B are block diagrams illustrative of a network environment for providing a network-based software service user interface and user information user interface in accordance with an aspect of the present invention.
Figure 5B:
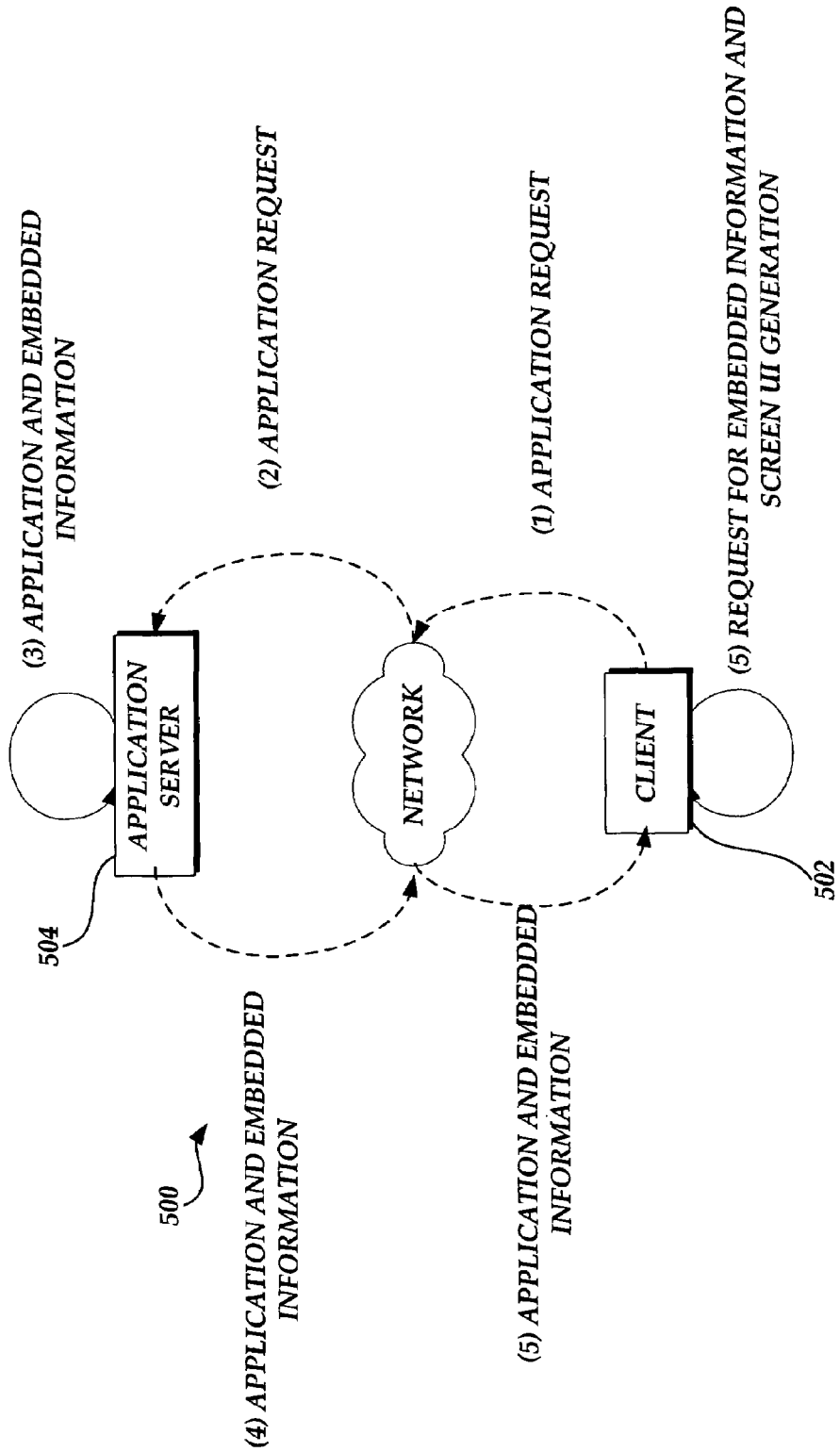

With reference now to FIGS. 5A and 5B, an illustrative operating environment 500 will be described. With reference to FIG. 5A, the operating environment 500 includes a plurality of receiving computing devices, such as client computing devices 502, that can communicate via a communication network, such as the Internet or an intranet. In an illustrative embodiment, the client computing devices 502 can include a software application, such as a browser software application to facilitate communication via the network. The operating environment also includes one or more sending computing devices, such as an application server 504, that communicate with the client computing devices 502. The application servers 504 can provide the software service to the client computing devices 502. Additionally, the application servers 504 can provide the user information user interfaces 200 that can be displayed on the client computing devices 502. One skilled in the relevant art will appreciate that the client computing device 502 and/or application servers 504 can correspond to a variety of computing devices such as personal computers, hand-held computers, mobile computers, mobile telephones, server computers, and the like.

With reference to FIG. 5B, in an illustrative embodiment, the client computing devices 502 can generate a request for a software service application via the communication network. The application request is received an appropriate application server 504, which generates, or otherwise retrieves, the appropriate code to generate the software service user interface and user information user interface on the client computing device. The code is then transmitted to the client computing device 502. In an illustrative embodiment, the client computing device 502 and application server 504 can continue exchanging data requests and code generation throughout the utilization of the software service by the client computing device.

While illustrative embodiments have been illustrated and described, it will be appreciated that various changes can be made therein without departing from the spirit and scope of the invention.

The embodiments of the invention in which an exclusive property or privilege is claimed are defined as follows:

1. In a communication network including at least one sending computing device and a receiving computing device, wherein the receiving computing device requests data from the sending computing device corresponding to a software service and wherein the receiving computing device generates a user interface corresponding to the software service on a display, a method for providing information regarding the software service comprising:

obtaining a request for information corresponding to the software service;

associating the request for information with at least one display control corresponding to the software service user interface; and generating a user information display on the receiving computing device, wherein generating the user information display comprises:

overlapping the software service user interface display, displaying the user information display adjacent to a particular control of the software service user interface, wherein displaying the user information display comprising adjusting the user information display to at least one of the following: a different location, a different format, and a different orientation and wherein displaying the user information display comprises:

displaying a graphical icon, wherein the graphical icon is selectable to initiate the at least one display control, displaying a textual identifier, wherein the textual identifier is selectable to initiate the at least one display control, displaying information associated with the at least one display control, wherein the information associated with the at least one display control comprising at least one of the following: descriptive information, frequently asked questions, and enhanced user information, displaying a selectable control associated with the at least one display control, wherein the selectable control is distinguished in a set of selectable display icons, wherein each selectable control is adjacent to each other, and wherein the selectable control is different if a different display control is selected, displaying directional controls, and displaying a graphical pointer to the at least one display control and data corresponding to the at least one display control.

2. The method as recited in claim 1, wherein obtaining a request for information corresponding to the software service corresponds to a first implementation of the software service on the receiving computing device.

3. The method as recited in claim 1, wherein obtaining a request for information corresponding to the software service corresponds to a user initiated request for information from the software service.

4. The method as recited in claim 1, wherein the at least one display control corresponds to a set of graphical display controls on the software service user interface and wherein the user information display further includes the set of selectable display icons corresponding to the set of graphical display controls on the software service user interface.

5. The method as recited in claim 4 further comprising:

obtaining a second request for information corresponding to the software service;

associating the request for information with a second display control corresponding to the software service user interface; and generating on the user information display on the receiving computing device a graphical pointer to the second display control and data corresponding to the second display control.

6. The method as recited in claim 5, wherein obtaining a second request for information corresponds to a user selection of a selectable display icon on the user information display.

7. The method as recited in claim 5, wherein obtaining a second request for information corresponds to a user selection of the second display control on the software service user interface.

8. In a communication network including at least one sending computing device and a receiving computing device, wherein the receiving computing device requests data from the sending computing device corresponding to a software service and wherein the receiving computing device generates a user interface corresponding to the software service on a display, a method for providing information regarding the software service comprising:

obtaining a request for information corresponding to the software service;

associating the request for information with at least one display control corresponding to the software service user interface, wherein the at least one display control corresponds to a set of graphical display controls on the software service user interface; and generating a user information display on the receiving computing device, wherein generating the user information display comprises:

overlapping the software service user interface display, displaying the user information display adjacent to a particular control of the software service user interface, wherein displaying the user information display comprising adjusting the user information display to at least one of the following: a different location, a different format, and a different orientation and wherein displaying the user information display comprises:

displaying a graphical icon, wherein the graphical icon is selectable to initiate the at least one display control, displaying a textual identifier, wherein the textual identifier is selectable to initiate the at least one display control, displaying information associated with the at least one display control, wherein the information associated with the at least one display control comprising at least one of the following: descriptive information, frequently asked questions, and enhanced user information, displaying a selectable control associated with the at least one display control, wherein the selectable control is distinguished in a set of selectable display icons, wherein each selectable control is adjacent to each other, and wherein the selectable control is different if a different display control is selected, and displaying directional controls, and wherein generating the user information display on the receiving computing device includes:

generating on the user information display a graphical pointer to the at least one display control, generating on the user information display data corresponding to the at least one display control, and generating on the user information display the set of selectable display icons corresponding to the set of graphical display controls on the software service user interface.

9. The method as recited in claim 8, wherein obtaining a request for information corresponding to the software service corresponds to a first implementation of the software service on the receiving computing device.

10. The method as recited in claim 8, wherein obtaining a request for information corresponding to the software service corresponds to a user initiated request for information from the software service.

11. The method as recited in claim 8 further comprising:

obtaining a second request for information corresponding to the software service;

associating the request for information with a second display control corresponding to the software service user interface; and generating on the user information display on the receiving computing device a graphical pointer to the second display control and data corresponding to the second display control.

12. The method as recited in claim 11, wherein obtaining a second request for information corresponds to a user selection of a selectable display icon on the user information display.

13. In a communication network including at least one sending computing device and a receiving computing device, wherein the receiving computing device requests data from the sending computing device corresponding to a software service and wherein the receiving computing device generates a user interface corresponding to the software service on a display including a set of graphical display controls, a computer-readable medium having computer-executable components for providing information regarding the software service comprising:
- a display control identification component for identifying at least one display control corresponding to the software service user interface;
- a display control information component for identifying data corresponding to the at least one display control;
- a display control selection component for selecting a display control, wherein the display control selection component includes a set of selectable display icons corresponding to the set of graphical display controls on the software service user interface,
  - wherein the display control is adjacent to a particular control of the software service user interface, wherein the display control is adjustable to at least one of the following: a different location, a different format, and a different orientation, and
  - wherein the display control displays the following:
    - a graphical icon, wherein the graphical icon is selectable to initiate the at least one display control,
    - a textual identifier, wherein the textual identifier is selectable to initiate the at least one display control,
    - information associated with the at least one display control, wherein the information associated with the at least one display control comprises at least one of the following: descriptive information, frequently asked questions, and enhanced user information, and
    - a selectable control associated with the at least one display control, wherein the selectable control is distinguished in a set of selectable display icons, wherein each selectable control is adjacent to each other, and wherein the selectable control is different if a different display control is selected.

14. The computer-readable medium as recited in claim 13, wherein the display control identification component includes a pointer to the at least one display control on the software service user interface.

15. The computer-readable medium as recited in claim 13, further comprising a second display control selection component for selecting a second display control, wherein the second display control selection component includes a second set of selectable display icons corresponding to a second set of graphical display controls on the software service user interface.

16. The computer-readable medium as recited in claim 15, wherein the second display control selection component comprises:
- a second graphical icon, wherein the second graphical icon is selectable to initiate the second display control,
- a second textual identifier, wherein the second textual identifier is selectable to initiate the second display control,
- a second data, wherein the second data comprises at least one of the following: descriptive information, frequently asked questions, and enhanced user information, and
- a second selectable control associated with the second display control, wherein the second selectable control is distinguished in a second set of selectable display icons, wherein each selectable control is adjacent to each other, and wherein the second selectable control is different if a third display control is selected.

* * * * *